No. 739,257. PATENTED SEPT. 15, 1903.
A. L. CUSHMAN.
CHANGE SPEED DRIVING MECHANISM.
APPLICATION FILED NOV. 21, 1902.
NO MODEL. 2 SHEETS—SHEET 1.
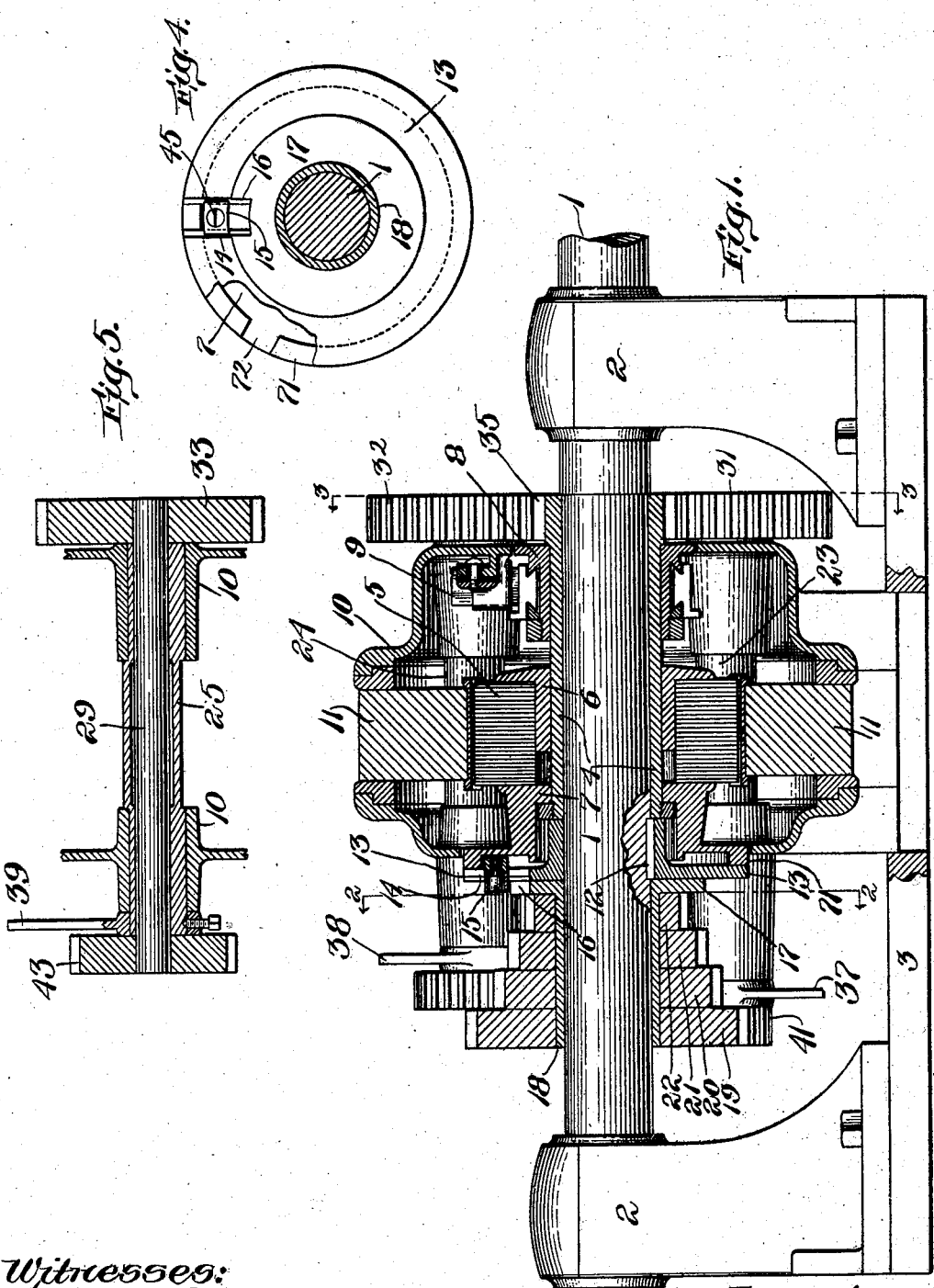
Witnesses:
Inventor:
by Roberts & Mitchell
Attorneys.

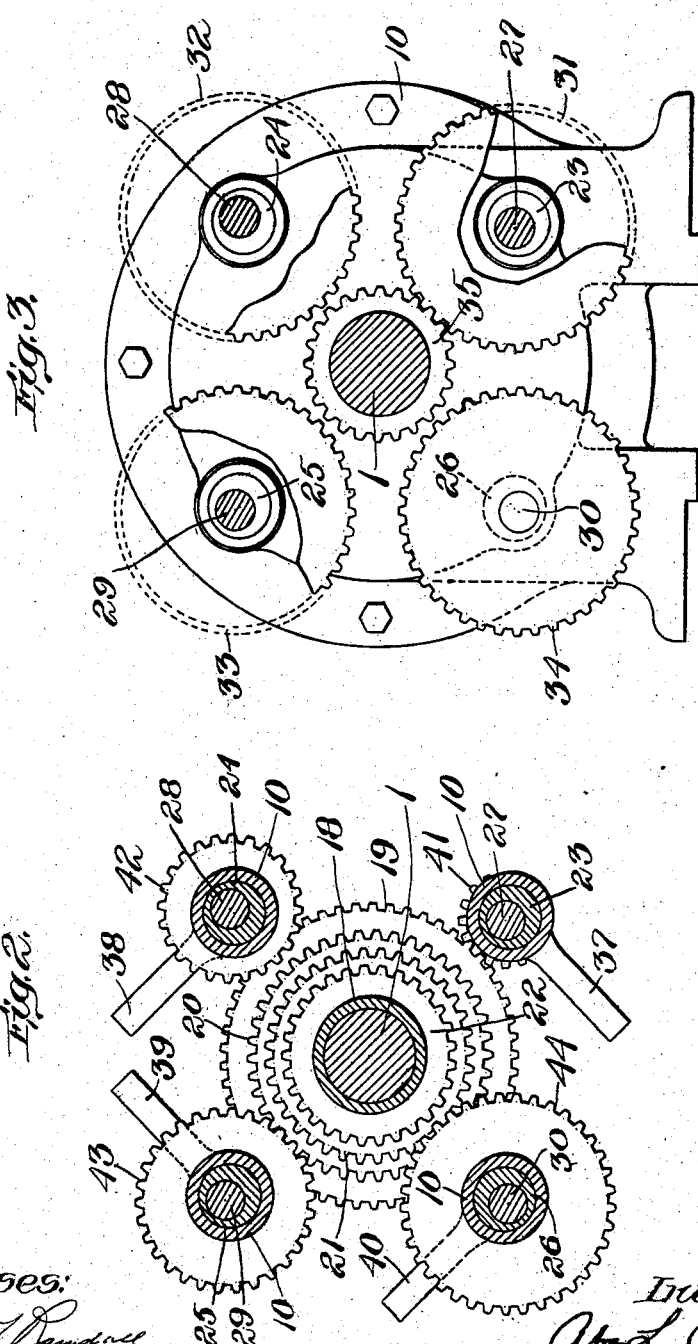

No. 739,257. Patented September 15, 1903.

UNITED STATES PATENT OFFICE.

ABE L. CUSHMAN, OF CONCORD, NEW HAMPSHIRE.

CHANGE-SPEED DRIVING MECHANISM.

SPECIFICATION forming part of Letters Patent No. 739,257, dated September 15, 1903.

Application filed November 21, 1902. Serial No. 132,252. (No model.)

*To all whom it may concern:*

Be it known that I, ABE L. CUSHMAN, a citizen of the United States, and a resident of Concord, in the county of Merrimack and State of New Hampshire, have invented new and useful Improvements in Change-Speed Driving Mechanism, of which the following is a specification.

My invention relates to change-speed driving mechanism for transmitting power, by which the speed of a driven member may be varied without change of the prime power or of the speed of the driving member.

The object of my invention, functionally speaking, is to enable the operator in charge to impart to a driven member, which may be the main shaft in any piece of machinery or machine-tool, different degrees of speed suited to the different exigencies of the work whereon he is employed. For performing this function I have devised a change-speed mechanism comprising a driving member to which power is applied, a driven member, power-transmitting devices on said members, and an intermediate power-transmitting device. I have herein shown a number of intermediate power-transmitting devices consisting of gears united in pairs, each pair adapted to connect a gear on the driving member with one of a number or set of gears on the driven member, whereby the speed imparted by the driving member to the driven member may be varied or changed by throwing into operative position any one of the different intermediate devices.

Another feature of my invention resides in the combination with a driving member to which power is applied, a driven member, power-transmitting devices on said members, and an intermediate power-transmitting device adapted to be moved into and out of operative position, of means for detachably connecting the driven member directly to the driving member. I am thereby enabled to transmit power from the driving to the driven member either immediately or mediately through said connections.

Other features of my invention are hereinafter pointed out.

In the embodiment of my invention and improvements shown in the drawings the driving-motor is an electric motor. I prefer to employ an electric motor as part of my combination, for the reason that this form of driving power is extremely compact and effective and lends itself peculiarly well to the mechanical arrangements which characterize my improvements. Obviously, however, power might be transmitted to the train of mechanism here shown and presently to be described by modes other than that specifically illustrated. When the electric motor is not used as a dynamo, its armature-shaft constitutes the driving member. When used as a dynamo, the armature-shaft becomes the driven member. The former use is the one herein illustrated. All the power-transmitting devices are herein shown as gears; but obviously other forms of connections, such as friction-wheels or pulleys and belts, could be used instead if suitable to the nature of the work to be done.

In the drawings hereto annexed, which illustrate one embodiment of my invention, Figure 1 is a central longitudinal section of an electric motor embodying my invention. Fig. 2 is a section on line 2 2 of Fig. 1 viewed in the direction indicated by the arrows. Fig. 3 is a section on line 3 3 of Fig. 1 viewed in the direction indicated by the arrows. Figs. 4 and 5 are details described below.

1 represents the driven member, herein shown as a shaft journaled in bearings on standards 2 2, fixed to a base 3. 4 represents the driving member, to which power is applied, and herein said member is shown as a hollow armature-shaft of a motor and as journaled on shaft 1.

The core 5 of the armature of the motor is clamped between two rings 6 and 7, which are both fast on armature-shaft 4. The commutator 8 of the motor is also fast on the armature-shaft 4, as usual, and contacts with the usual brushes, one of which is shown at 9, fixed to a bracket upon but insulated from the casing 10 of the motor. The field-magnets 11 are fixed to the casing 10, their windings, as well as the windings of the armature and the other electrical connections, which are as usual, being for clearness omitted from the drawings.

Fixed to the driven shaft 1, as by key 12, is a ring 13, provided at its periphery with a radial slot 14, in which is a bolt 15, clamped fast to ring 13. The bolt 15 projects into a slot 16, provided in the periphery of a flange 17, forming part of a sleeve 18, on which is fixed a set of gears 19, 20, 21, and 22 of different sizes, which constitute step-gears. By means of the bolt 15 the sleeve 18 may be made fast to the driven shaft 1, but is capable of being disconnected therefrom, as hereinafter explained.

Journaled in bearings provided in casing 10 are a number of sleeves 23, 24, 25, and 26, four in number, as shown in the drawings, each of which is made with an eccentric bore, as shown clearly in Figs. 2 and 3. In the eccentric bores of these sleeves are journaled supplemental shafts 27, 28, 29, and 30, and fast on said shafts are gears 31, 32, 33, and 34 of like size arranged in proximity to a pinion 35, integral with or fast upon the armature-shaft 4. Fast on sleeves 23, &c., are levers 37, 38, 39, and 40, by means of which the sleeves may be rocked in their bearings.

Shaft 27 has fast upon its end opposite gear 31 a gear 41, arranged in proximity to the step-gear 19, while the shafts 28, 29, and 30 carry gears 42, 43, and 44, respectively, of different sizes and arranged in proximity to the step-gears 20, 21, and 22, respectively. The pairs of gears upon each of said supplemental shafts may be termed "back" gears or "intermediate" gears.

It will now be clear that by rocking one of the sleeves, as 23, in its bearings by means of its lever the eccentricity of the shaft carried by the sleeve throws that shaft and the parts upon it bodily toward or from the axis of the machine and that by this movement the gears on each shaft may be thrown into or out of mesh with gear 35 and gears 19, 20, 21, or 22, as the case may be.

In order to simplify the construction, the gears 41, &c., are made of different sizes, each to correspond with its gear 19, 20, 21, or 22, so that all of the shafts 27, &c., may be made to have the same range of movement toward and from the axis of the machine, although this difference in the relative sizes of gears 41, &c., and the similarity of range of movement of shafts 23, &c., is not essential so long as the gears 19, &c., vary in size. Neither is it essential to my invention that the gears 19, &c., be of different sizes so long as gears 41, &c., vary in size. I prefer, however, to make the two sets of gears 19, &c., and 41, &c., both of different-sized gears, as shown, so that the range of movement of all of the shafts 27, &c., will be the same. I am also enabled thereby to make the gears 31, &c., all of one size.

To enable the operator to connect the driving with the driven member either directly or mediately through one of the supplemental shafts and its intermediate gears, I have devised the means which I will now describe by which the step-gears may be detachably secured to their member, (shown in the drawings as the driven member,) and by which the other member carrying the fast gear may be detachably secured to the driven member.

The bolt 15 is made in two parts and is clamped to the sides of slot 14 by means of a screw 45, so that when desired screw 45 may be loosened and the bolt moved half-way out of slot 14, as shown in Fig. 1, and clamped in place again. When bolt 15 occupies this position, sleeve 18 runs loose on shaft 1 and there is no movement of the latter. The ring 7, which is part of the armature of the motor, is made with an annular peripheral wall 71, between which and flange 17 the bolt 15 stands when at the middle of slot 14, and through this peripheral wall is provided a radial slot 72 of a size to receive bolt 15. This slot 72 is provided so that when desired the bolt 15 may be moved beyond the middle of slot 14 to the outer end thereof and into engagement with slot 72. When in this position, the armature-shaft 4 is connected to shaft 1 through ring 7, bolt 15, and ring 13, and shaft 1 is thereby directly driven from armature-shaft 4. Thus it will be clear that by means of bolt 15 not only is the variable-speed mechanism thrown into and out of action, but a direct connection between shafts 1 and 4 may be provided at will.

Instead of the construction above described, in which the gear on the driving member is fast and the set of gears on the driven member is detachably secured, obviously the same result would be obtained if the gear on the driving member were detachably secured thereto and the step-gears were fast upon the driven member.

By the above-described construction any one of five different speeds may be given to shaft 1, assuming the speed of the motor to be substantially invariable. This change of speed may be accomplished very quickly, as it involves none of the delays incident to the removal and insertion of change-gears in a train as in ordinary practice.

The range of variation between the different speeds may be determined by the relative sizes of the gears in train.

I do not confine my invention to the precise construction and arrangement of parts herein shown and described, for obviously these may be widely varied without departing from the invention. Furthermore, the invention is useful in other connections than with an electric motor.

What I claim, and desire to secure by Letters Patent, is—

1. In a change-speed mechanism, in combination, a motor having a hollow motor-shaft; a shaft within the motor-shaft; a gear on the motor-shaft at one side of the motor; a gear on the other shaft at the other side of the motor; a supplemental shaft alongside of the motor; gears on the supplemental shaft for engaging the gears on the other two shafts, and means movably supporting the supplemental shaft on the frame of the motor so that it can be shifted into and out of operative position.

2. In a change-speed mechanism, in combination, an electric motor; a hollow armature-shaft; an inner shaft extending through the hollow armature-shaft; a gear on the armature-shaft at one side of the motor; a gear on the inner shaft at the other side of the motor; a supplemental shaft alongside of the motor; gears on the supplemental shaft for engaging the gears on the other two shafts, and means movably supporting the supplemental shaft so that it can be shifted into and out of operative position.

3. In a change-speed mechanism, in combination, an electric motor; a hollow armature-shaft; an inner shaft extending through the hollow armature-shaft; a gear on the armature-shaft on one side of the motor; a gear on the inner shaft at the opposite side of the motor; a supplemental shaft alongside of the motor; gears on the supplemental shaft for engaging the gears on the other two shafts; and means movably supporting the supplemental shaft on the frame of the motor so that it can be shifted into and out of operative position.

4. In a change-speed mechanism, in combination, an electric motor; a hollow armature-shaft; an inner shaft extending through the hollow armature-shaft; a gear on the armature-shaft at one side of the motor; a gear on the inner shaft at the opposite side of the motor; a supplemental shaft alongside of the motor; gears on the supplemental shaft for engaging the gears on the other two shafts; and a sleeve journaled on the frame of the motor in which the supplemental shaft is eccentrically journaled.

5. In a change-speed mechanism, in combination, an electric motor; a hollow armature-shaft; an inner shaft extending through the hollow armature-shaft; a gear on one of said shafts at one side of the motor; a set of step-gears on the other one of said shafts at the opposite side of said motor; a number of supplemental shafts alongside of the motor; means movably supporting the supplemental shafts so that they can each be shifted into and out of operative position, and gears on the supplemental shafts for engaging the gears on the other shafts.

6. In a change-speed mechanism, in combination, an electric motor; a hollow armature-shaft; an inner shaft extending through the hollow armature-shaft; a gear on one of said shafts at one side of the motor; a set of step-gears on the other one of said shafts at the opposite side of said motor; a number of supplemental shafts alongside of the motor; gears on the supplemental shafts for engaging the gears on the other shafts; and means movably supporting the supplemental shafts on the frame of the motor so that said shafts can be shifted into and out of operative position.

7. In a change-speed mechanism, in combination, an electric motor; a hollow armature-shaft; an inner shaft extending through the hollow armature-shaft; a gear on one of said shafts at one side of the motor; a set of step-gears on the other one of said shafts at the opposite side of said motor; a number of supplemental shafts alongside of the motor; gears on the supplemental shafts for engaging the gears on the other shafts; a number of sleeves journaled on the frame of the motor in each of which one of the supplemental shafts is eccentrically journaled.

8. In a change-speed mechanism, in combination, an electric motor; a hollow armature-shaft; an inner shaft extending through the hollow armature-shaft; a gear on one of said shafts at one side of the motor; a set of step-gears on the other one of said shafts at the opposite side of the motor; a number of supplemental shafts alongside of the motor; gears on the supplemental shafts for engaging the gears on the other shafts; a number of sleeves journaled on the frame of the motor in each of which one of the supplemental shafts is eccentrically journaled, and an arm fixed to each sleeve by which to turn each sleeve to shift the supplemental shaft carried by it into and out of operative position.

9. In a change-speed mechanism, in combination, a driving member; a driven member; an adjustable coupling-bolt carried by one of said members; the other member being provided with a socket adapted to coöperate with the bolt to connect the driving and driven members directly; a gear; connections between the gear and the driving member for operating the gear; the gear being provided with a socket adapted to coöperate with the bolt; the two sockets being so arranged that when the bolt is shifted into engagement with one socket it is free from the other socket.

10. In a change-speed mechanism, in combination, an electric motor; a hollow armature-shaft; an inner shaft extending through the hollow armature-shaft; a gear on one of said shafts at one side of the motor; a set of step-gears on the other one of said shafts at the opposite side of the motor; a bolt carried by one of said shafts; the other shaft being provided with a bolt-socket adapted to be engaged by the bolt to directly connect the two shafts; the set of step-gears being provided with a bolt-socket adapted to be engaged by the bolt; the two sockets being so arranged that when the bolt is shifted into engagement with one socket it is free from the other socket; a number of supplemental shafts alongside of the motor; gears on the supplemental shafts for engaging the gears on the other shafts; and means movably supporting the supplemental shafts on the frame of the motor so that each may be shifted into and out of operative position.

11. A change-speed mechanism comprising a base, a driven shaft journaled in bearings on the base; a hollow armature-shaft surrounding the driven shaft; an electric motor fixed to the base; a gear mounted on one of said shafts at one side of the motor; a set of step-gears mounted on the other shaft at the opposite side of the motor; a group of supplemental shafts; gears on the supplemental shafts for engaging the gears on the other shafts; sleeves journaled in the frame of the motor in each of which is eccentrically mounted one of the supplemental shafts whereby it may be shifted into and out of operative position.

12. In a variable-speed driving mechanism, the combination of a driven shaft, a rotary motor mounted concentrically with said shaft, step-gears mounted on said shaft, a group of supplemental shafts each carrying a back gear appropriate to one of the steps, each of said shafts movable to and from the step-gears, and connections whereby the motor can be joined to the driven shaft immediately or mediately through a back gear and its step-gear.

Signed by me at Concord, New Hampshire, this 18th day of November, 1902.

ABE L. CUSHMAN.

Witnesses:
  BENJAMIN A. KIMBALL,
  LUTHER W. DURGIN.